(12) United States Patent
Simpson

(10) Patent No.: US 8,215,893 B2
(45) Date of Patent: Jul. 10, 2012

(54) MOTORCYCLE LIFT DEVICE

(76) Inventor: George T Simpson, Sanford, NC (US)

( * ) Notice: Subject to any disclaimer, the term of this patent is extended or adjusted under 35 U.S.C. 154(b) by 213 days.

(21) Appl. No.: 12/702,506

(22) Filed: Feb. 9, 2010

(65) Prior Publication Data

US 2011/0194919 A1    Aug. 11, 2011

(51) Int. Cl.
    *B60P 1/04* (2006.01)
(52) U.S. Cl. ......... 414/478; 414/462; 414/480; 414/538
(58) Field of Classification Search .......... 414/462, 414/478, 480, 491, 522, 538, 541
    See application file for complete search history.

(56) References Cited

U.S. PATENT DOCUMENTS

| | | | | |
|---|---|---|---|---|
| 3,843,001 A * | 10/1974 | Willis | ................ | 414/462 |
| 3,927,779 A * | 12/1975 | Johnson | ................ | 414/462 |
| 4,932,829 A * | 6/1990 | Miller | ................ | 414/462 |
| 5,730,577 A | 3/1998 | Jones | | |
| 5,846,047 A | 12/1998 | Riekki | | |
| 6,099,232 A * | 8/2000 | Dixon et al. | ................ | 414/494 |
| 6,176,672 B1 * | 1/2001 | Egan et al. | ................ | 414/462 |
| 6,413,033 B1 * | 7/2002 | Monroig, Jr. | ................ | 414/480 |
| 6,524,056 B1 * | 2/2003 | Kloster | ................ | 414/538 |
| 6,698,994 B2 * | 3/2004 | Barrett | ................ | 414/462 |
| 6,817,825 B1 * | 11/2004 | O'Hagen | ................ | 414/477 |
| 2004/0052622 A1 * | 3/2004 | Chisnall | ................ | 414/462 |
| 2004/0062629 A1 * | 4/2004 | Kelly | ................ | 414/462 |
| 2007/0122259 A1 | 5/2007 | McGrath | | |
| 2009/0263220 A1 * | 10/2009 | Miller | ................ | 414/478 |
| 2011/0038698 A1 * | 2/2011 | Li | ................ | 414/479 |

* cited by examiner

*Primary Examiner* — James Keenan
(74) *Attorney, Agent, or Firm* — James G. Passé; Passé Intellectual Property, LLC

(57) ABSTRACT

The present invention relates to a motorized device that can be operated by one person to load and unload a motorcycle onto and off of a truck bed or similar cargo area of a motor vehicle or trailer. The device taught herein may be employed to lift a motorcycle to the level of the truck bed then moved within the bed for transport and storage.

7 Claims, 17 Drawing Sheets

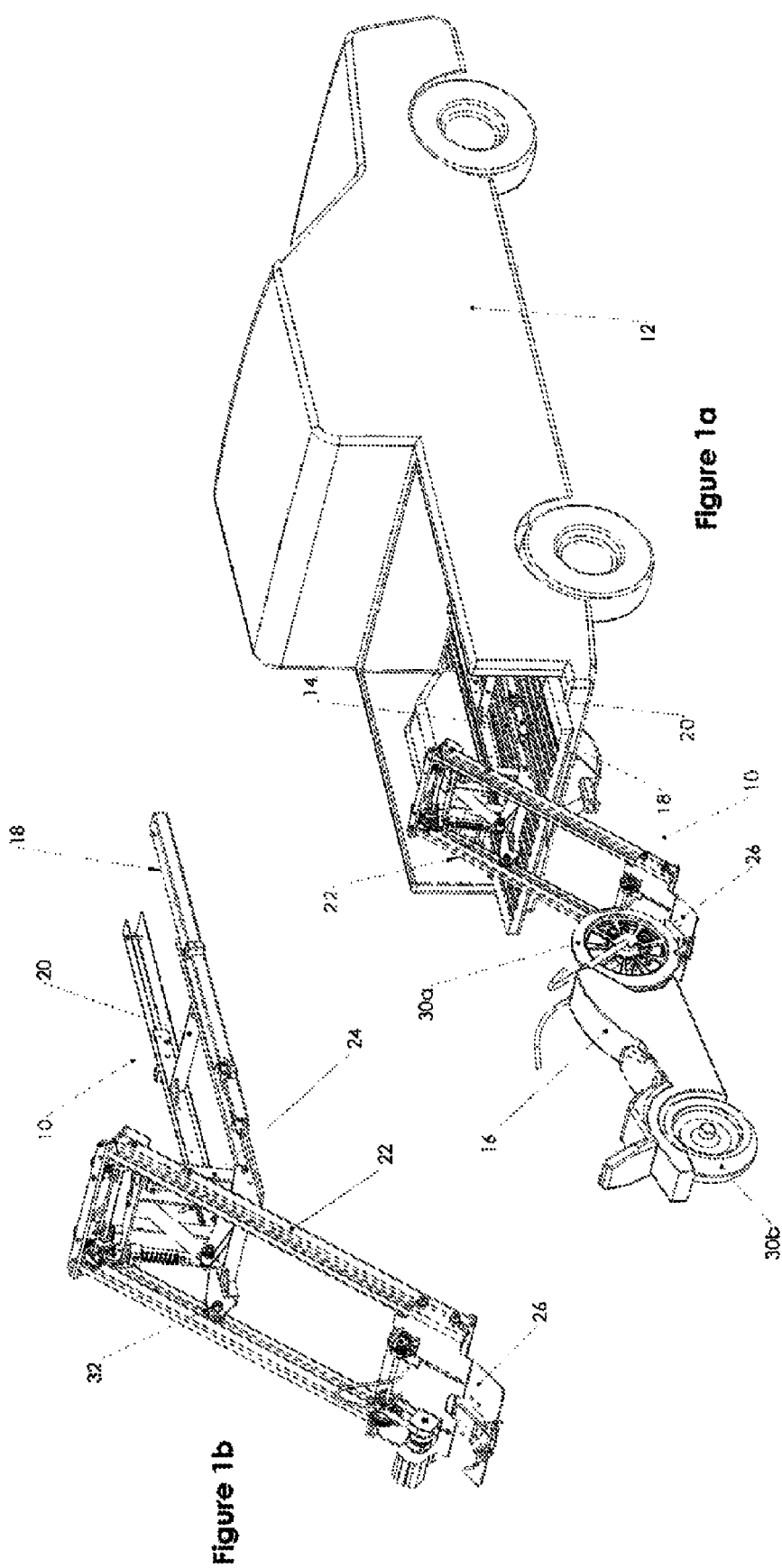

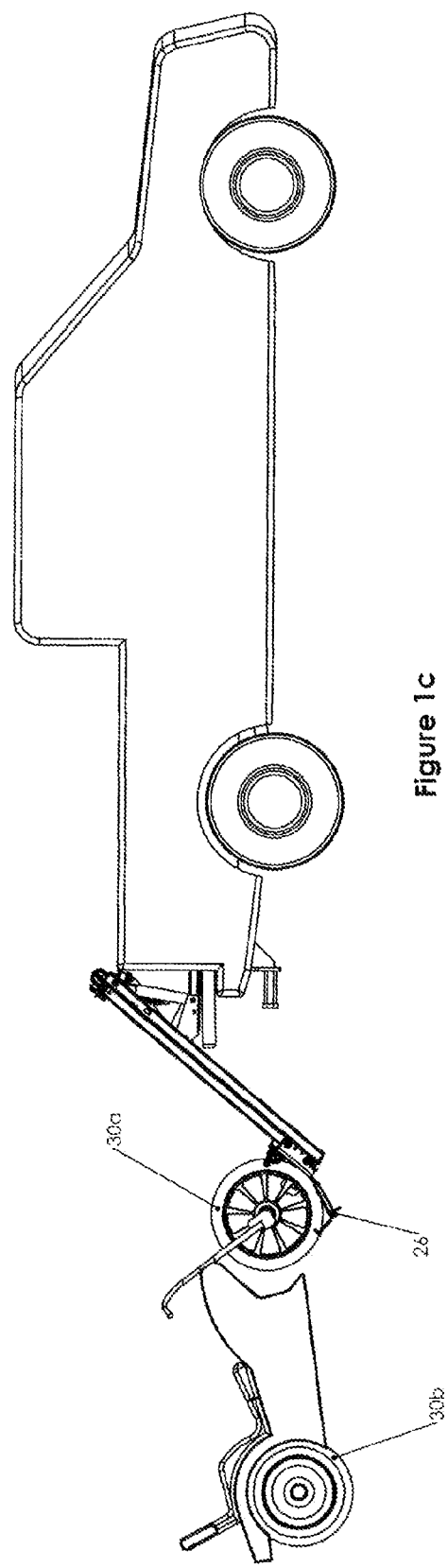

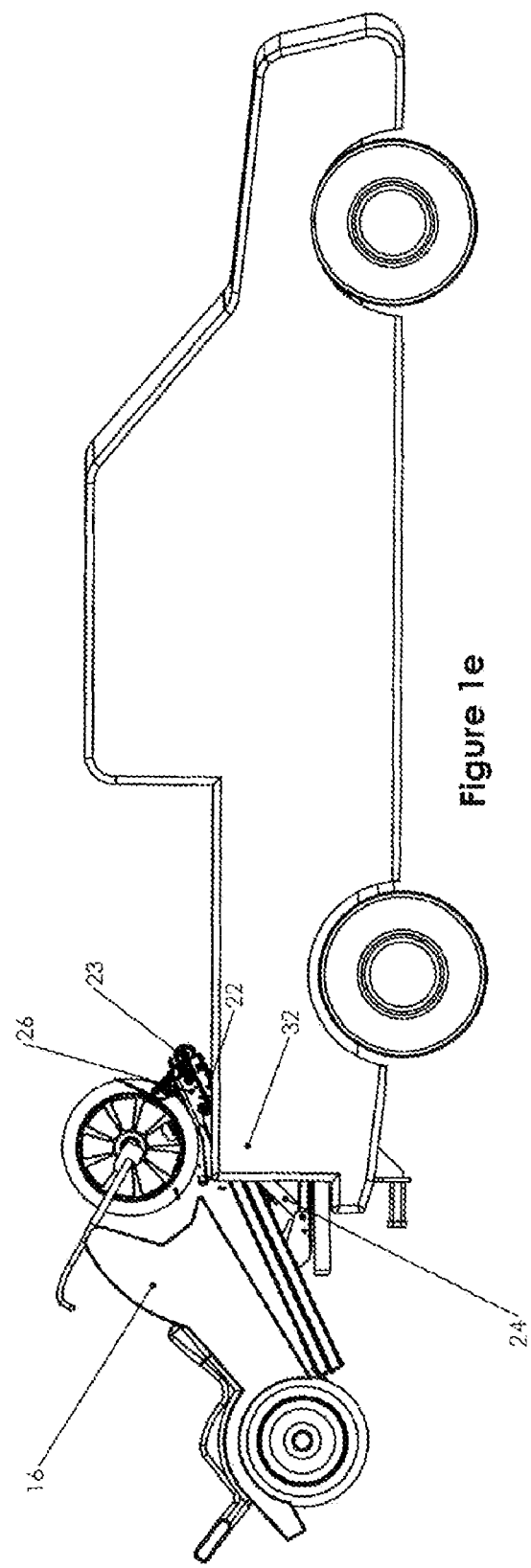

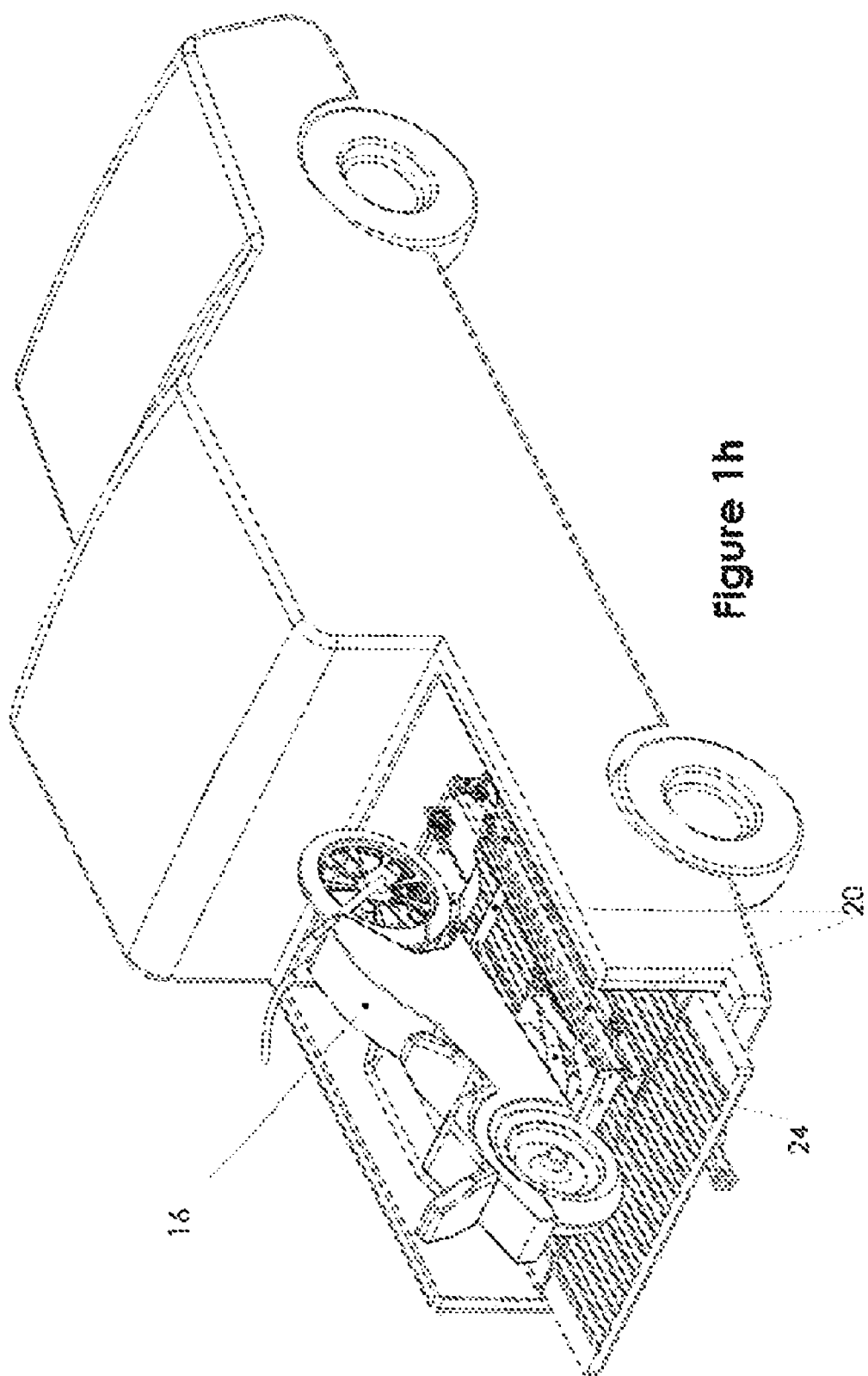

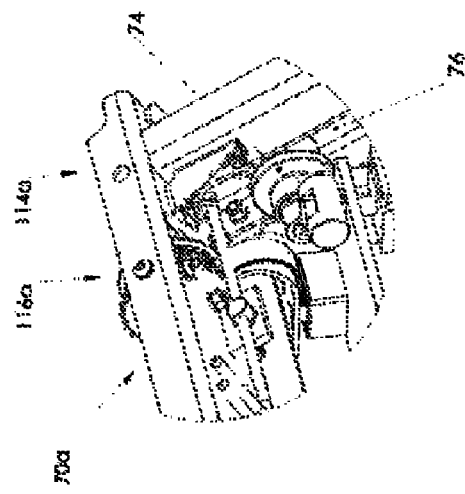
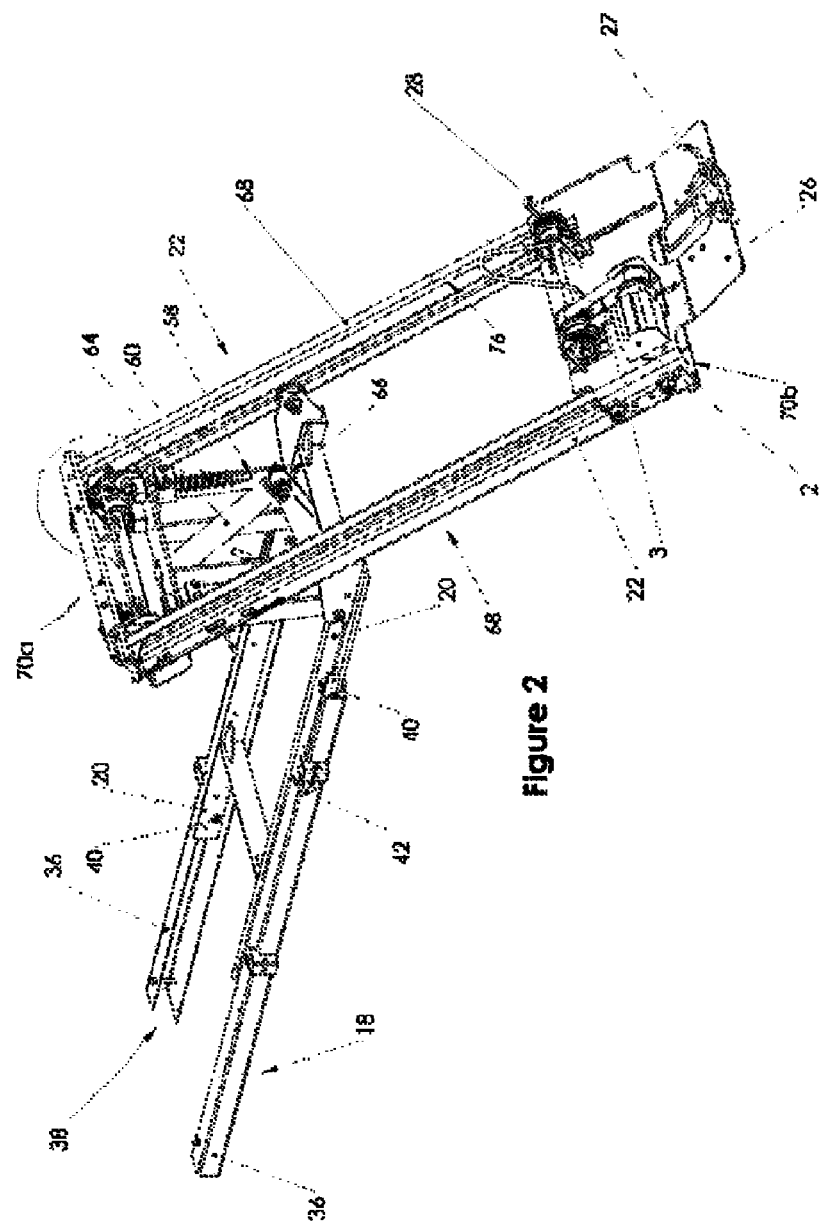
Figure 2a
Figure 2

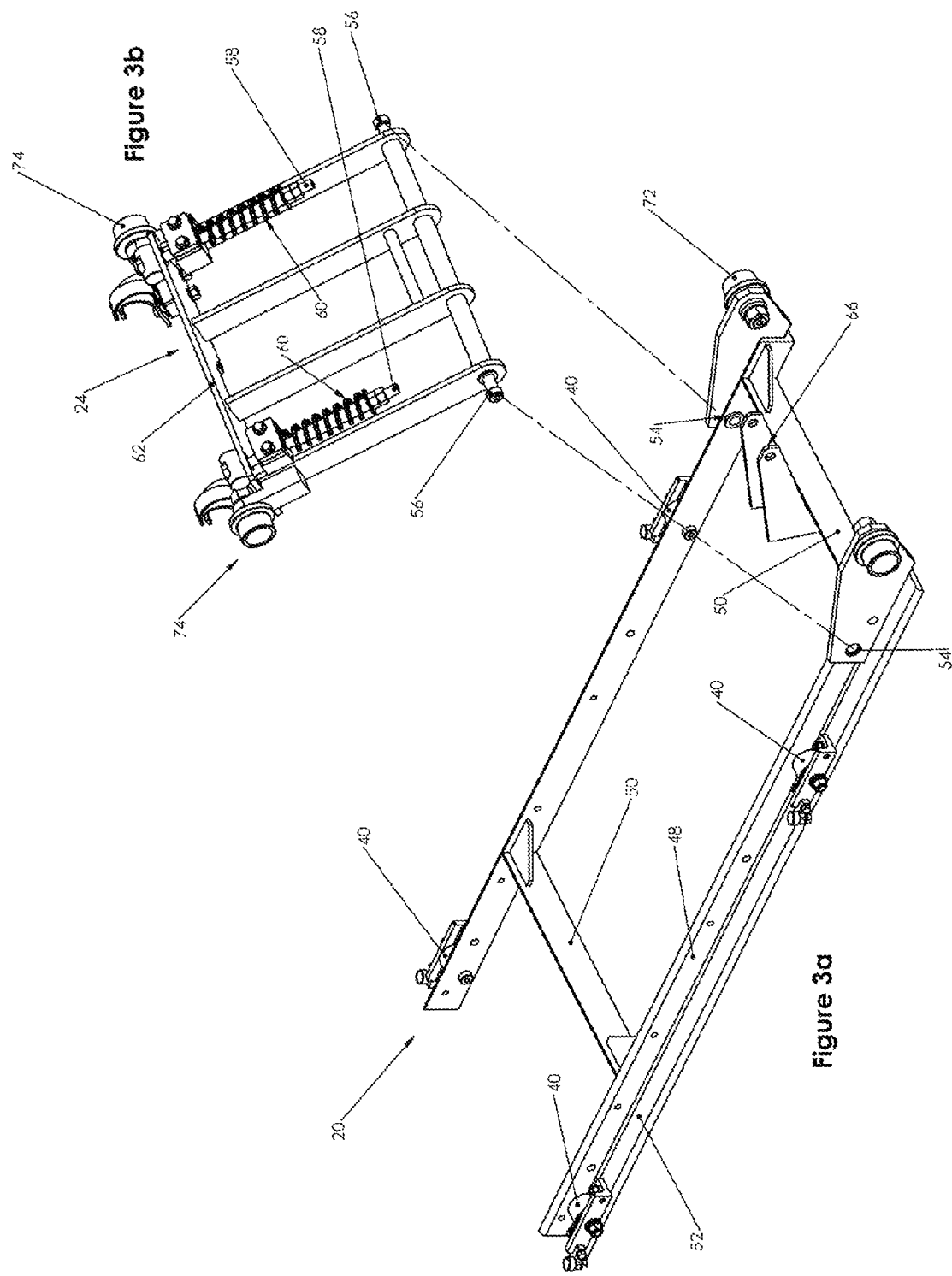

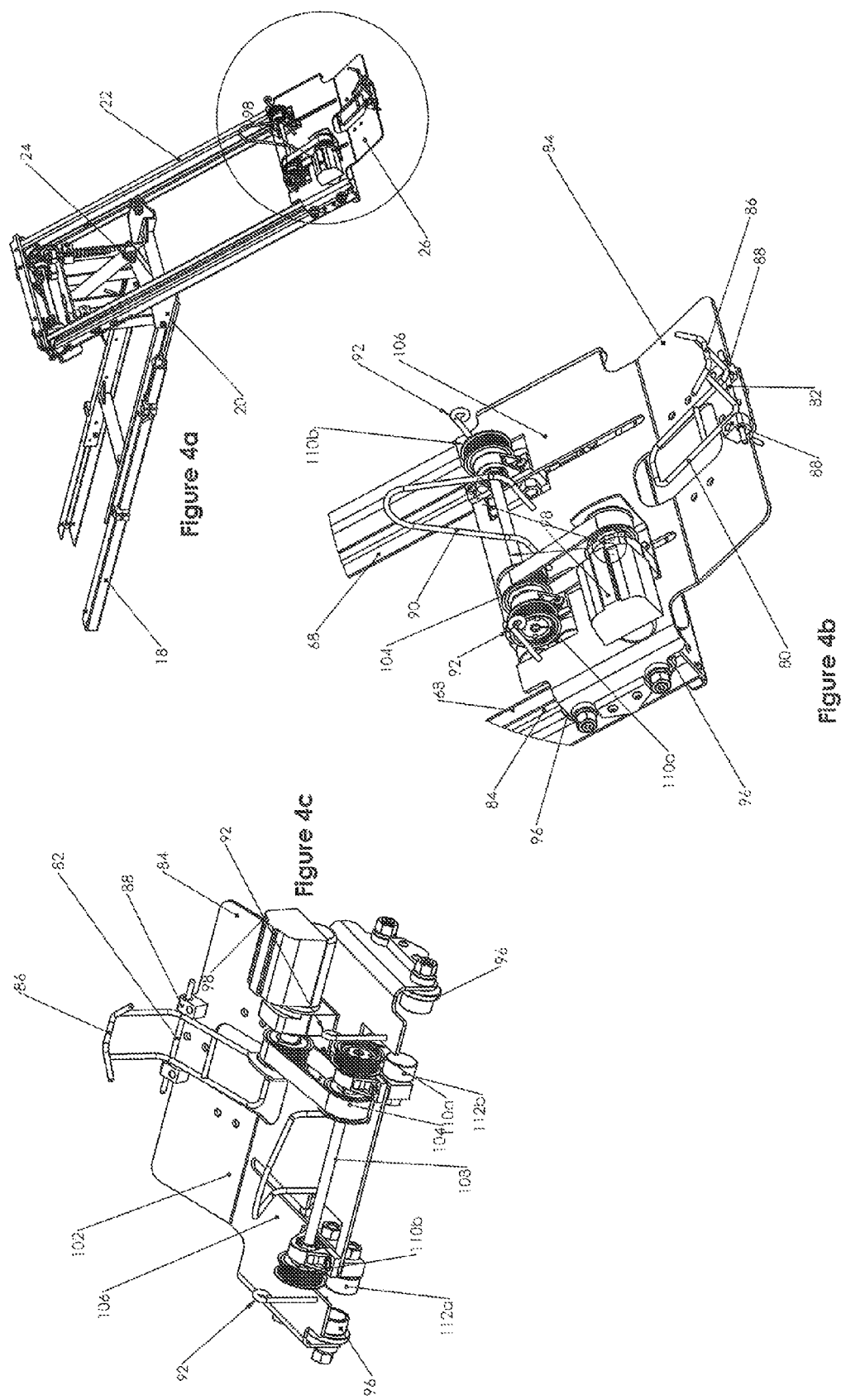

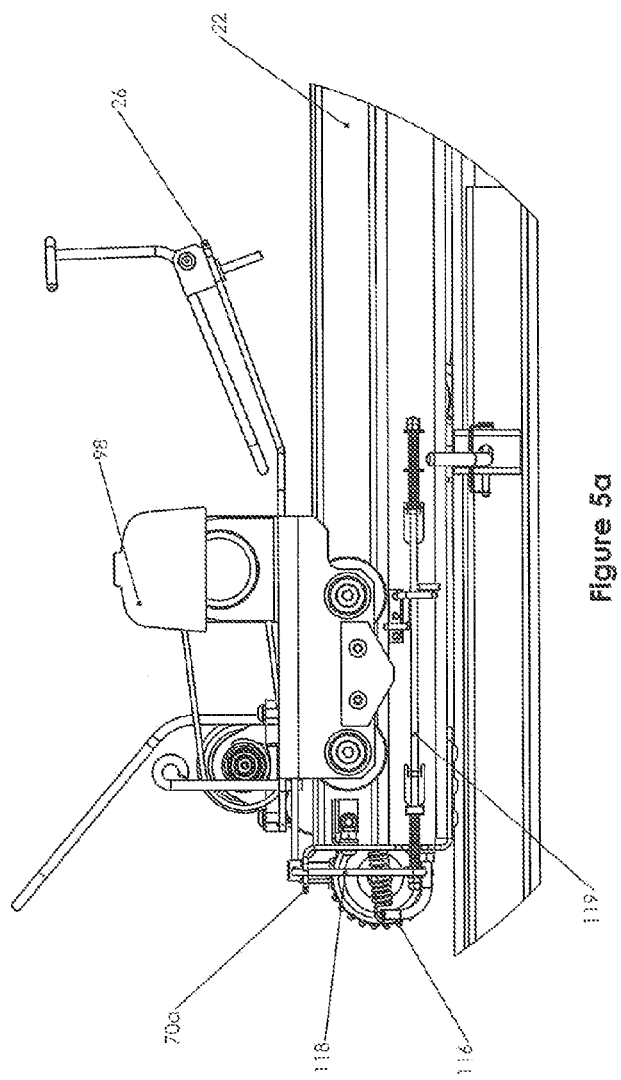
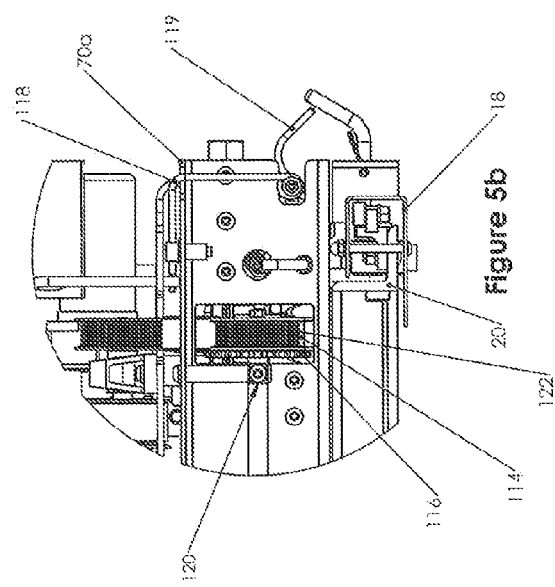

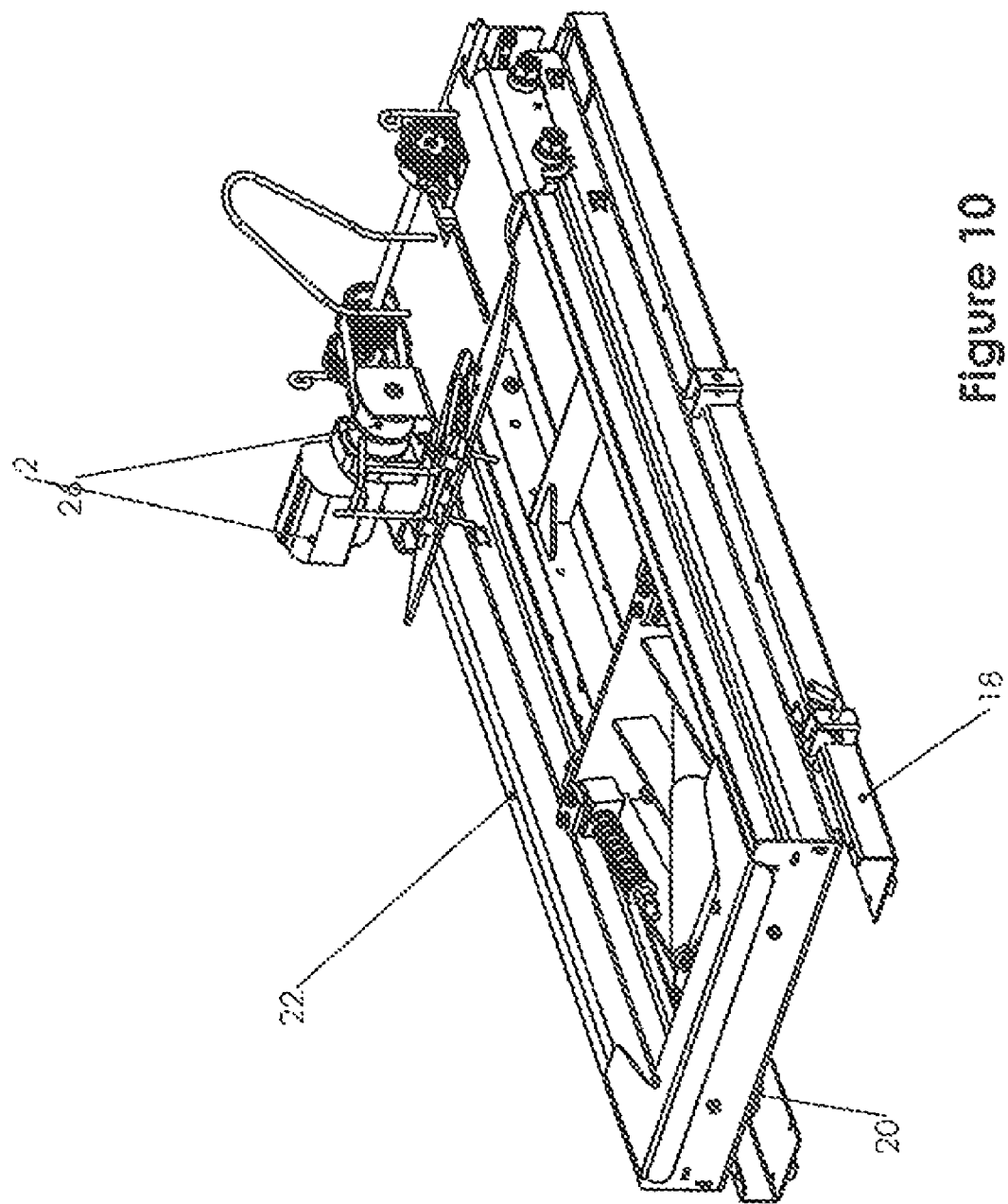

MOTORCYCLE LIFT DEVICE

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

1. Field of the Invention

The present invention relates to a device to facilitate loading and unloading of a motorcycle onto and off of a truck bed or similar cargo area of a motor vehicle or trailer.

2. Description of Related Art

Some motorcycles such as those for racing or trail riding are neither designed nor allowed by law to be ridden on public highways. Therefore, these specialized cycles must be transported in a truck, van, or trailer to the site where they are to be ridden. Further, on occasion, even cycles designed for street and highway use must be transported such as when they are in need of repair. Placing a cycle in a motor vehicle or trailer requires, as a fist step, elevating the cycle from ground level to the bed or floor, i.e. cargo area, of the vehicle or trailer. After a cycle has been placed in the cargo area, it must be fastened securely to prevent it from swaying or falling, which could cause damage to both the cycle and the transporting vehicle not to mention the risk of causing a serious accident by distracting the vehicle driver. Unless the cargo area is set up specifically for transporting a cycle, proper securing of the cycle can be time consuming.

Typically, a motorcycle is elevated to the level of the cargo carrying area of a vehicle by pushing it up a ramp. While this method is simple and ramps are inexpensive, pushing a heavy cycle up a ramp can require two or more people. While a winch or similar device may the employed to do the hard work, there is still the need for one person to hold the cycle upright and steer it and another to operate the winch. A skilled cyclist may be able to ride a cycle up the ramp if the cycle is operational, but riding it down backwards to unload it is dangerous for even an experienced cyclist.

Devices of many styles and configurations for loading and unloading motorcycles ranging from the simple to the sophisticated are described in the art, and a wide selection of ramps are commercially available. Some of the more sophisticated ramp systems incorporate electrically powered winching and stabilizing systems to permit one person to perform loading and unloading operations, e.g., see U.S. Pat. Nos. 5,730,577 and 5,846,047.

BRIEF SUMMARY OF THE INVENTION

One aspect of the present invention is a lift device for loading and unloading a motorcycle onto and off of the bed of a truck comprising:
  a) an under frame capable of being affixed to the bed of the truck;
  b) a main frame slidably affixed to the under frame;
  c) a carriage;
  d) a pivot frame attached in between the main frame and the carriage;
  e) a motor;
  f) a shuttle that is capable of being moved by the motor along the carriage between a first end and an opposite second end where it is attached to the pivot frame;
wherein:
  i. the under frame is comprised of two substantially parallel rails;
  ii. the main frame is comprised of at least two substantially parallel and connected rails;
  iii. the shuttle comprises a motorcycle attachment device;
  iv. the shuttle and carriage are capable of pivoting with the pivot frame to lie substantially flat against the main frame when the shuttle is at the second end; and
  v. the motor can slidably move the shuttle, carriage and main frame along the under frame from a first position to a second position when the shuttle is at the second end.

A second aspect of the invention is the use of the device taught herein to facilitate loading and unloading a motorcycle onto and off of the bed of a truck.

BRIEF DESCRIPTION OF THE DRAWINGS

FIG. 1*a* is an overview of the lift of the present invention attached to a truck bed.

FIGS. 1*b*-1*h*, along with FIG. 1*a*, are sequentially illustrations of how the lift device is used for loading and unloading (by reversing the sequence) a motorcycle.

FIG. 2 is a detailed illustration of the present lift device.

FIG. 2*a* is a detailed illustration of a corner of the carrier where it connects to the pivot frame as noted in FIG. 2

FIG. 3*a* is a detailed illustration of the main frame of the lift device.

FIG. 3*b* is detailed illustration of the pivot frame of the lift device.

FIG. 4*a* is an overview of the lift device showing the relation of the shuttle to the other four major subassemblies as the shuttle appears prior to loading.

FIG. 4*b* is an enlarged view of the circle area of FIG. 4*a* showing the shuttle.

FIG. 4*c* is a detailed drawing of the shuttle 26.

FIG. 5*a* is a side view of the lift device illustrating the shuttle as far as it can move along the carrier.

FIG. 5*b* corresponds to FIG. 5*a* but is viewed perpendicular to a cross member, the carrier.

FIGS. 6 through 10 depict the lift operating from a loading to a transport position in a series of drawings without a motorcycle for clarity.

DETAILED DESCRIPTION OF THE INVENTION

Figure 1D:
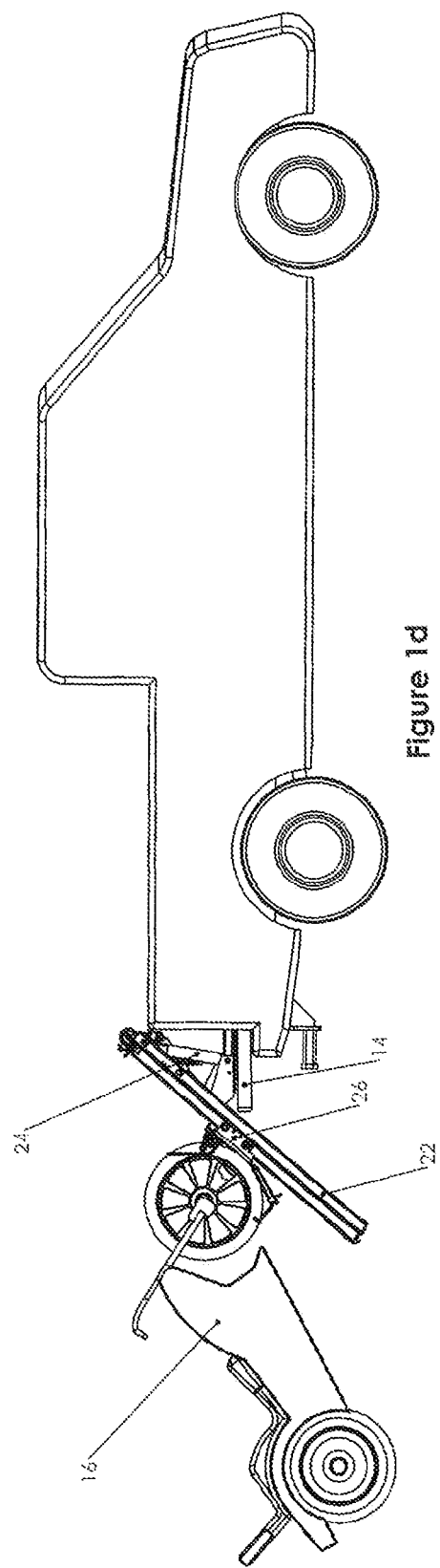

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings. This detailed description defines the meaning of the terms used herein and specifically describes embodiments in order for those skilled in the art to practice the invention.

The terms "a" or "an", as used herein, are defined as one as or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The term "motorcycle" and "cycle" are used synonymously herein and refer to two wheel motor vehicles having one wheel in front and one in the rear in the same plane. This term also includes motors, scooters, and similar two wheel, powered vehicles smaller than a typical motorcycle.

The term "truck" means a motor vehicle having four or more wheels intended primarily for the transport of cargo typified by a pick-up truck. This term also includes vans, trailers, and large, closed bodied trucks. The term "truck bed" means the generally flat, cargo carrying part of a truck.

The term "lift" is a motorized device that facilitates moving a motorcycle from substantially ground level to the level of a truck bed.

The adjective "self-propelled" means that the item to which it refers is propelled by other than human power. As used herein, typically it refers to one or more items powered by motors and in one embodiment electric motors, such as a DC motor, conveniently receiving electric power from the battery or generator of a motor vehicle.

The present lift fulfills the need to safely and rapidly move a motorcycle from ground level up and into the bed of a truck (and the reverse) by a compact and easily stored device, which requires only one person to operate. Motorcycle lifts of the art require one or more ramps, or functional equivalents, and are bulky to store.

FIG. 1a is an overview of one embodiment of the motorcycle lift of the present invention ready for operation showing its relation with truck 12 (having truck bed 14) and motorcycle 16. Lift 10 is comprised of five major subassemblies: 1) under frame 18 affixed to truck bed 14; 2) main frame 20 attached to, supported by, and capable of telescoping into, under frame 18; 3) carriage 22; 4) pivot frame 24 that connects main frame 20 and carriage 22 which is capable of certain predetermined movement with respect to main frame 20; and 5) self-propelled shuttle 26 attached to, and capable of, moving along, carriage 22. Details of the invention as well as detailed descriptions of its subassemblies, their relationship to each other, and their operational interactions are presented in subsequent paragraphs. FIG. 1b shows the same view of the lift 10 without truck 12 or motorcycle 16 to assist in clarity.

Figure 1F:
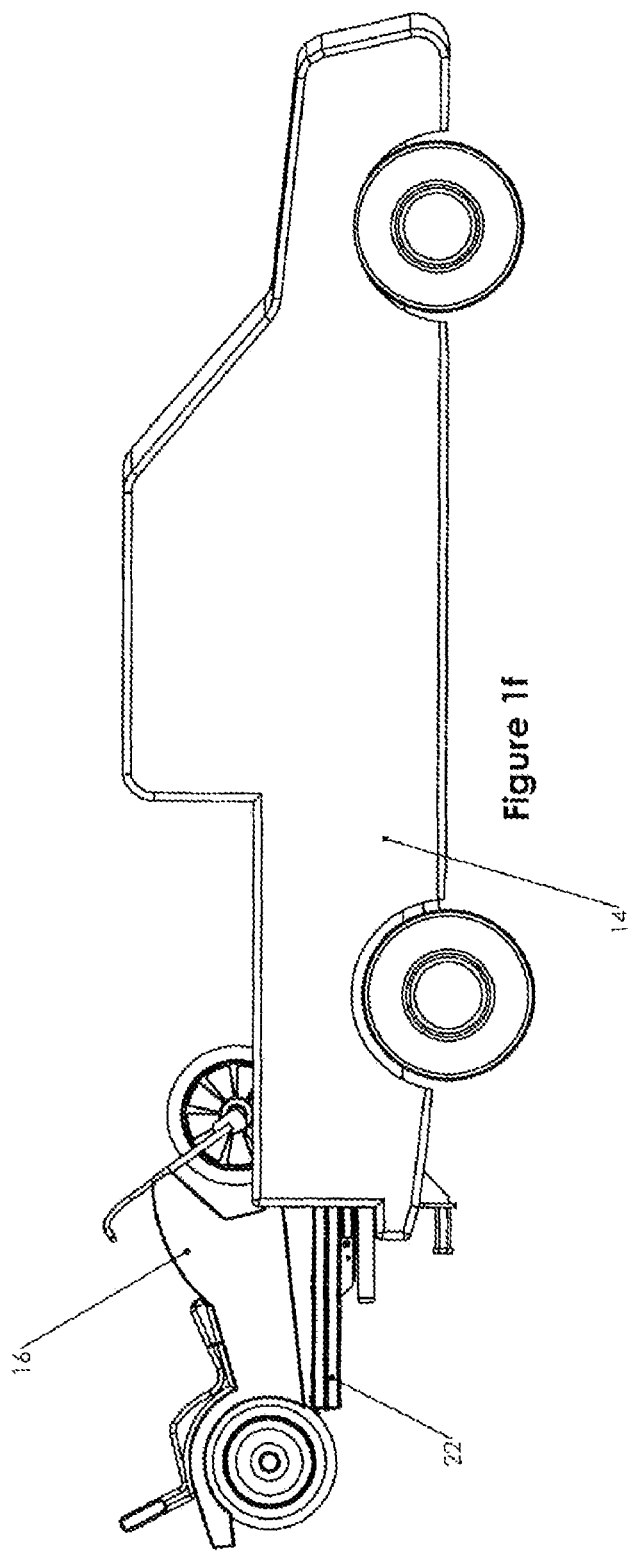
Figure 1G:
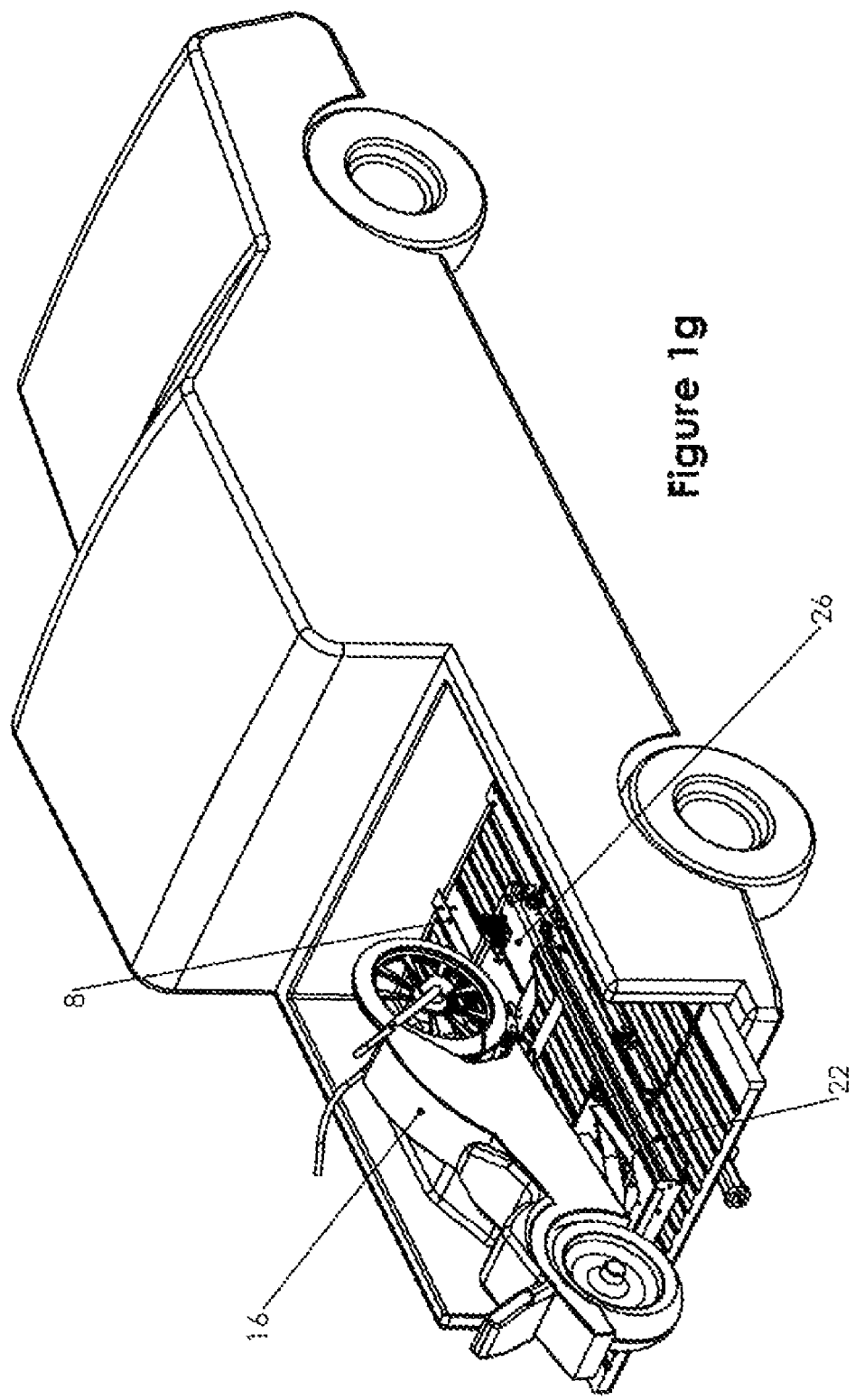
Figure 6:
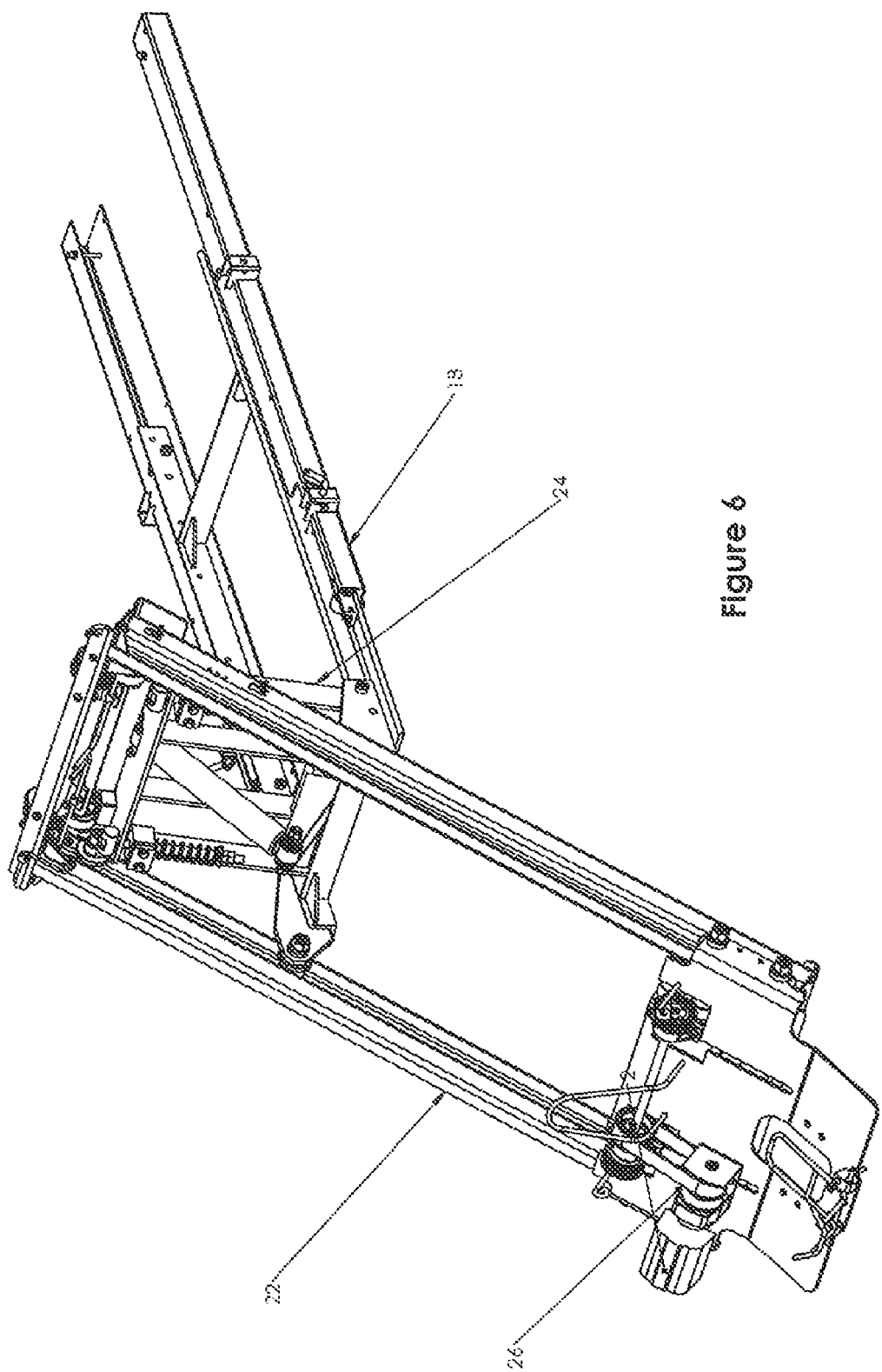
Figure 7:
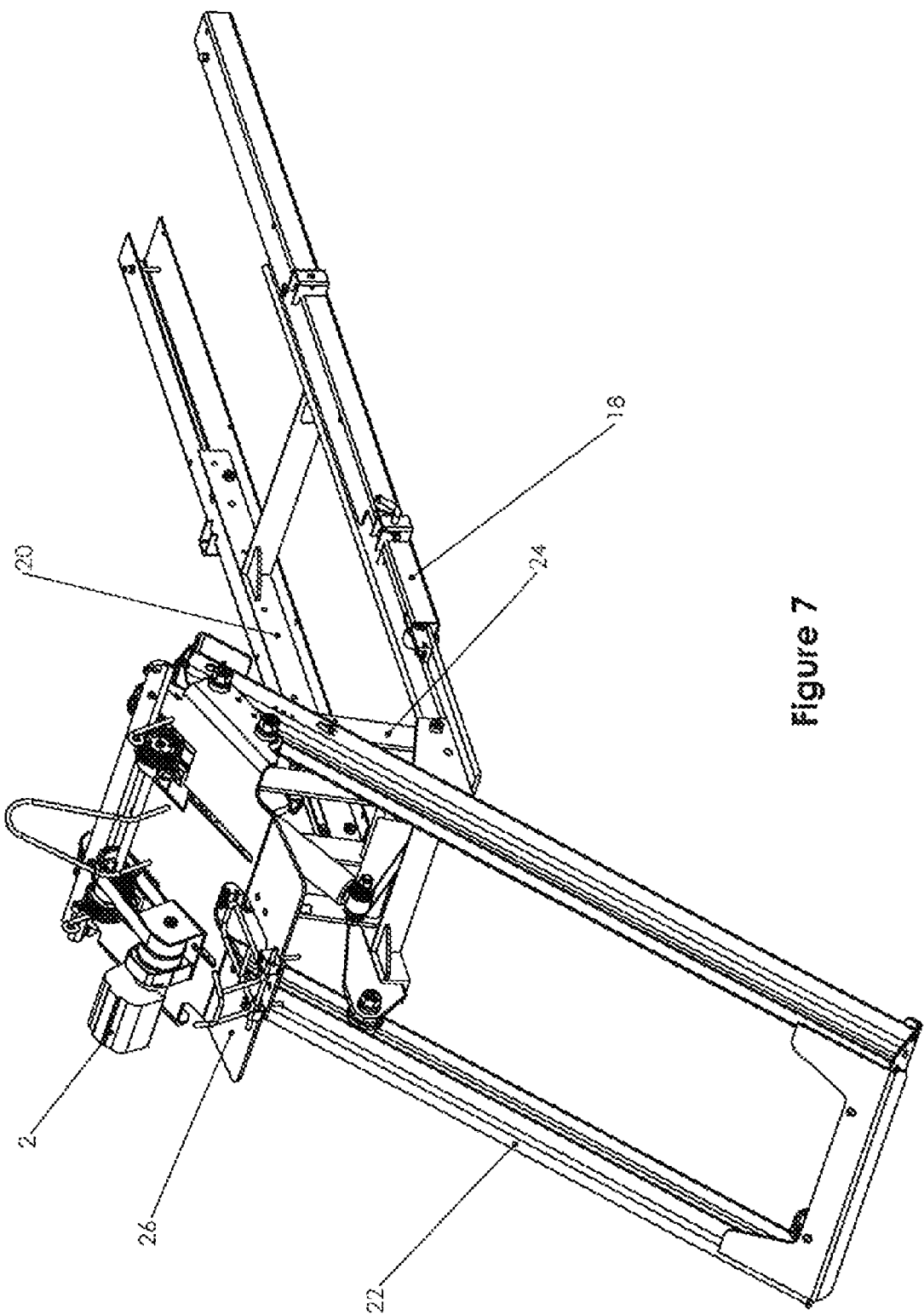
Figure 8:
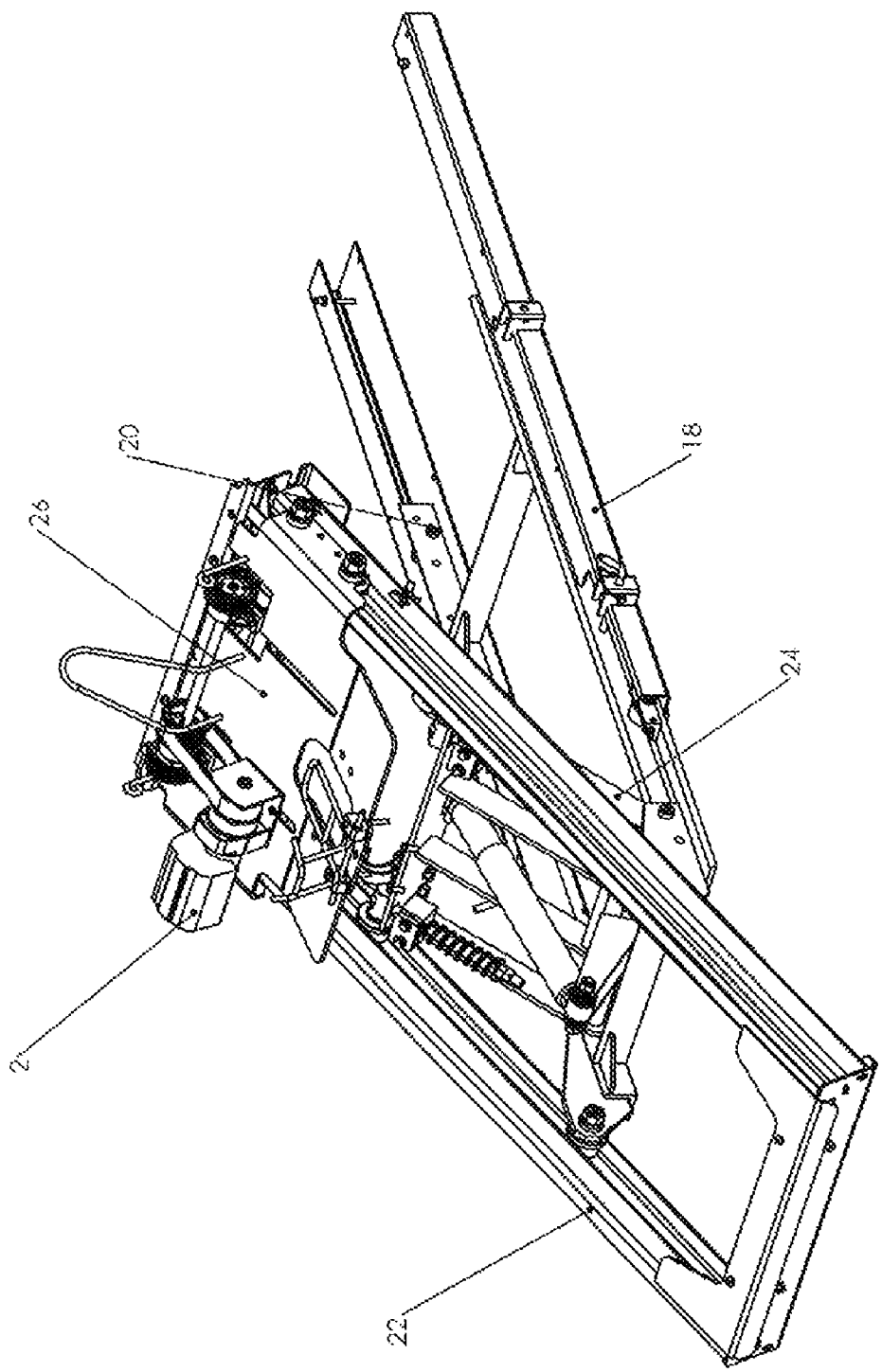
Figure 9:
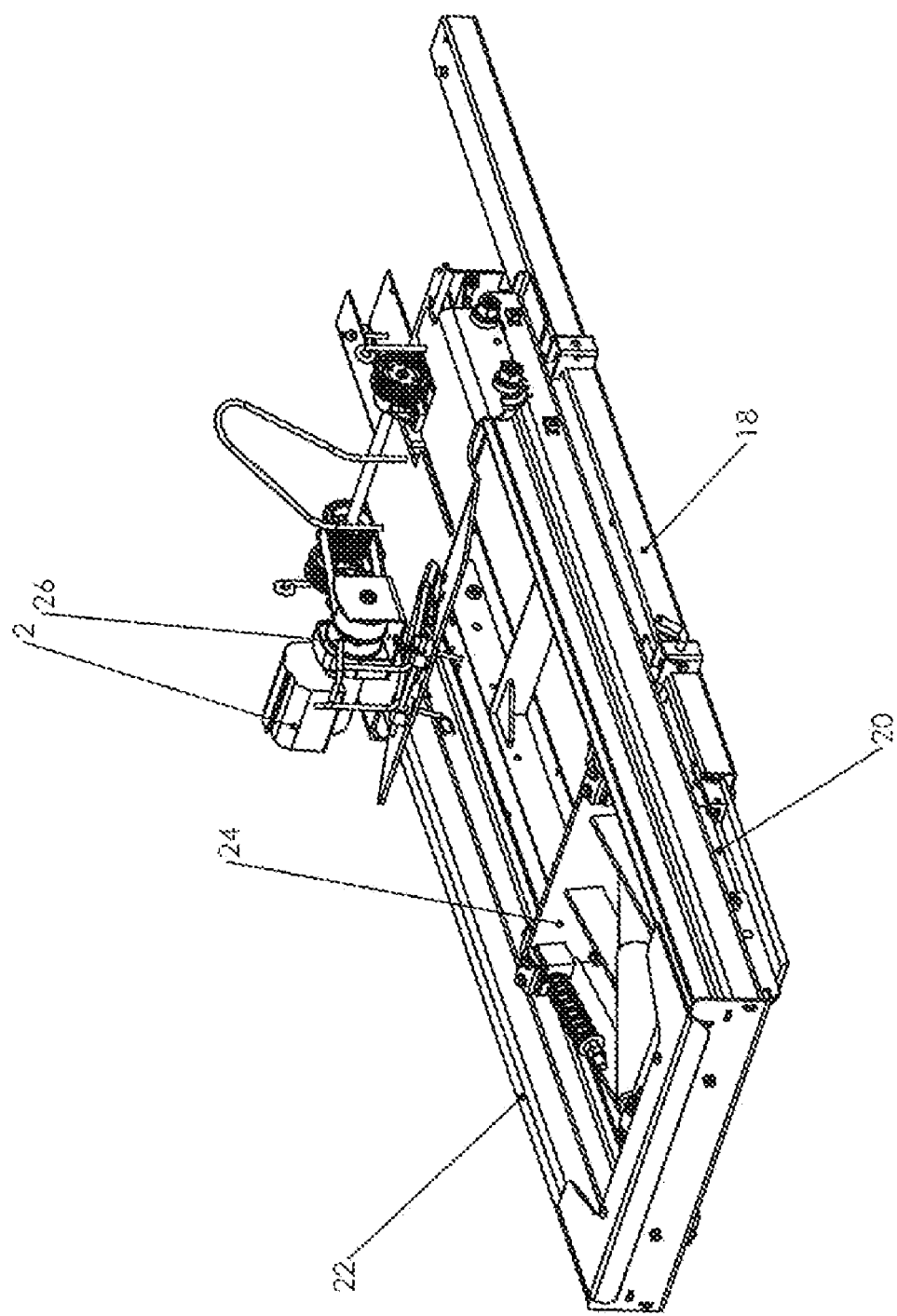

In the loading operation, motorcycle 16 is rolled onto shuttle 26, as shown in FIG. 1c (a side view of the starting position) and one of its wheels, i.e. front wheel 30a or rear wheel 30b, is attached to the shuttle 26. As illustrated in FIG. 1d, when the self-propelling means of shuttle 26 is activated (by motorized means) causing shuttle 26 and the attached motorcycle 16 to move up carriage 22 toward pivot frame 24 at, or near, the rear of truck bed 14. In FIG. 1e as shuttle 26 and motorcycle 16 near the top 23 of the carriage 22, the center of gravity of carriage 22 moves toward pivot points 32 of pivot frame 24. At this point the carriage 22 begins to move over the pivot point and into the truck forced by the weight of the motorcycle and shuttle 26. It should be noted in some embodiments, damping devices such as shock absorbers or other like devices can be used to slow the pivoting over the pivot point such that the movement is smooth and slow rather than a quick tipping movement. One skilled in the art could easily introduce such damping devices. In FIG. 1f, the center of gravity of the motorcycle 16, carriage 22 and shuttle 26 has passed over pivot points 32, and gravity has forced pivot frame 24 to fold back onto main frame 20, which in turn, causes the bottom of carriage 22 to contact the top of main frame 20, i.e., it assumes a position substantially parallel to truck bed 14 including the motorcycle. FIG. 1g shows this same position in perspective view. In this position carriage 22 is moving forward in the truck 14 by traveling along the under frame 18 via the telescoping main frame 20 which carries the motorcycle, carriage 22 and shuttle 26. The assembly and motorcycle continue to move forward until it has moved fully forward to position in the truck bed as far forward as permitted by the under frame 18 and in some embodiments the end of the truck bed 14 as depicted in FIG. 1h. This can be accomplished by a single motor switching between functions or by multiple motors which each have their own separate function. The present drawings depict a single motor.

FIG. 2 shows more detail of the lift of the present invention. The shuttle 26 has a wheel engagement means 27 for holding the wheel of a motorcycle during the loading process. Further stability is provided by tie-down bars 28. Tie down bars are depicted as relatively long but any relative length can be used and one skilled in the art could easily vary the length of the tie downs. The tie-down bars 28 can be used to tie the motorcycle, for example, by running straps from the handle bars of the motorcycle to the tie down bars to keep the motorcycle in place as it moves in and out of the truck. Shuttle 26 is provided with a means to move it along the carriage 22 and in this embodiment is propelled by electric motor 2. This movement can be guided between the shuttle 26 and carriage 22 for example, by roller bearings, wheels that run in channels and the like between the shuttle 26 and carriage 22. The motor 2 propels the shuttle 26 by means of a belt 3 driven mechanism in the depicted embodiment. Turning on the motor 2 in one direction propels the shuttle up the carriage 22 and reversing the motor 2 down the carriage 22. The motor 2 is depicted in the lowest position where a motorcycle is mounted to the shuttle 26. At the point the shuttle 26 reaches the top portion of the carriage 22 and can move no farther, there is a separate device for switching the motor movement from moving the shuttle 26 up the carriage 22, to moving the carriage 22 up over the pivot point and along the under frame 18 via the main frame 20.

Lift 10 is fixed into position with a locking means and motorcycle 16 is secured to truck bed 14 prior to transporting motorcycle 16. The unloading operation is substantially the reverse of the loading operation. Details of the invention as well as detailed descriptions of its subassemblies, their relationship to each other, and their operational interactions are presented in subsequent paragraphs.

Lift 10 may stay attached to truck bed 14 and remain unseen if a tonneau cover, or functionally similar cover, is used over the truck bed. Conveniently, truck 12 is a pickup truck, but other small to medium trucks, vans, trailers and the like may be employed. Lift 20 fits even short bed trucks, but it will still load and unload a full size motorcycle to and from the ground. While the present lift is primarily intended to assist in the handling and transport of motorcycles, it can be used for any related two wheel vehicle with in-line wheels such as a motor scooter. Also within the scope of the invention is the use of the lift 10 mounted onto a fixed platform, such as a work table, within a shop environment to raise a motorcycle to a suitable height to facilitate repair and maintenance.

Further depicted in FIG. 2, is an embodiment of under frame 18 which is comprised of two parallel, "U" shaped channels 36 with the openings 38 in the channels facing each other. Channels 36 are separated by an appropriate distance to allow main frame 20 to move within the channels. Under frame 18 may be affixed to truck bed 14 by welding, bolting, or any other suitable means. However, bolting with at least two bolts in each of channels 36 is one embodiment because it is inexpensive and allows relatively easy installation of lift 10 on, and detachment from, truck bed 14. Alternatively, a quick connect-disconnect system may be used to accomplish installation of the lift 10. Conveniently, main frame 20 is equipped with a means to facilitate movement within channels 36 of under frame 18 such as a plurality of wheels, rollers, or the like represented in FIG. 2 by roller 40.

In one embodiment a device is provided for locking main frame 20 at its fully contracted and operating extension distances to enhance security and safety, during transport and loading/unloading operations. For example, as illustrated in FIG. 2, locking pins 42 extend from the outer sides of channels 36, through the channels, and into corresponding holes in main frame 20. Conveniently, locking pins 42 are spring loaded so that they automatically snap into the locked positions as main frame 20 moves within channels 36, but are easily retracted to allow free movement.

Carriage 22 is comprised of two parallel rails 68 connected at their ends by cross members 70a and 70b, and the carriage 22 is connected to both the main frame 20 and the pivot frame 24 through a means that allows the carriage to pivot as its center of gravity is shifted over the pivot frame 24.

FIGS. 3a and 3b are detailed illustrations of main frame 20 and pivot frame 24 respectively as indicated. Observe that front end 44 of frame 20 is proximal to the truck cab, i.e. .front, part of truck 12 and rear end 46 is proximal to the rear of truck 12 while main frame 20 moves within channels 36 of under frame 18, which in turn, is affixed to truck bed 14. Side rails 48 are conveniently held rigid with respect to each other by cross members 50. Also, observe that rollers 40 (two are shown in side rail 48 proximal to the viewer, but the two in the distal side rail are blocked from view) are mounted in side rail base 52 of side rails 48 but protrude slightly below through an opening in the side rail bases so that they are in contact with the inside of under frame 18. Pivot frame 24 is attached to main frame 20 by a means that allows the pivot frame certain pivoting movement with respect to the main frame. For example, FIGS. 3a and 3b illustrate how bushings 54 (or the like) may interact with studs 56 (or the like) to provide such a pivoting means.

In one embodiment, pivot frame 24 is equipped with a means of cushioning and dampening its movement down toward main frame 20 (or the reverse during unloading) as motorcycle 16 and shuttle 26 move up carriage 22 and the center of gravity of the carriage shifts (see discussion of FIG. 1c-1h above). Examples of such a means, include a system of springs, dampeners and/or shock absorbers. As shown in FIG. 3b, and to some extent in FIGS. 1a-1h and 2, rods 58 surrounded by springs 60 connected to top plate 62 of pivot frame 24. As pivot frame 24 moves downward, the motion is resisted by springs 60. Likewise, as pivot frame 24 moves upward the motion is assisted by springs 60. To further cushion and dampen the movement of pivot frame 24, shock absorber 64 (shown in FIG. 2, but omitted for clarity in FIGS. 3a and 3b) is connected between brackets 66 and top plate 62 so that it is compressed with the downward movement of pivot frame 24. Multiple shock absorbers could also be used as well as other dampening devices, the positioning of which are within the scope of this invention.

In an embodiment illustrated in FIGS. 1-3b, rollers 72 attached to main frame 20 and rollers 74 attached to pivot frame 24 ride in grooves 76 that run longitudinally on the interior sides of parallel rails 68 (one of these grooves is visible in FIG. 2). FIG. 2a, is an enlarged view of a corner of carriage 22 where it attaches to pivot frame 24, and depicts how one roller of rollers 74 fits in one groove of groove 76. As shuttle 26, carrying motorcycle 16, advances close to top plate 62 and the center of gravity of carrier 22 shifts toward mainframe 20, pivot frame 24 moves downward causing rollers 74 to contact top plate 62.

FIG. 4a is an overview of lift 10 showing the relation of shuttle 26 to the other four major subassemblies as the shuttle appears prior to loading a motorcycle in place. Note that FIG. 4a is the same as FIG. 2, but is again presented here to show that FIG. 4b is an enlarged view of the circled area of FIG. 4a. FIG. 4c is a view from a slightly different perspective than FIG. 4b showing shuttle 26 without carriage 22. The reader will find it helpful during the following discussion to consider FIGS. 4a and 4b together. Before front wheel 30a of motorcycle 16 is rolled onto shuttle 26, elongated section 80 of lower wheel clamp 82 is substantially perpendicular to wheel plate 84 of shuttle 26, and short section 86 is in contact with the ground, or other surface upon which the motorcycle is resting.

As front wheel 30a is rolled toward, and engages with, wheel lower wheel clamp 82, elongated section 80 rotates about pivot points 88 so that the elongated section cradles the bottom of the wheel and short section 86 rests against the back of front wheel 30a. At the same time, the front of the wheel is wedged between the two rods comprising upper wheel clamp 90. Thus, the plane of front wheel 30a is held substantially perpendicular to wheel plate 84. FIG. 1 shows the front wheel of motorcycle 16 being held to shuttle 26 by lower wheel clamp 82 and upper wheel clamp 90, but this has been omitted from FIG. 4b for clarity. To further secure motorcycle 16 to shuttle 26, securing rods 92 extending from the shuttle are attached to the fork, which holds front wheel 30a, of the motorcycle by any suitable means such as quick-disconnect ties.

Continuing with FIGS. 4b and 4c, shuttle 26 has a plurality of rollers 96 that ride in grooves 94 in exterior of the sides of parallel rails 68 of carriage 22 to secure the shuttle to the carriage and yet allow free movement of the shuttle along the carriage. FIG. 4b illustrates rollers 96 riding in grooves 94. Shuttle 26 is equipped with a means of propelling it along carriage 22. While this may be a manual means, in one embodiment, it is an electric motor that is powered by the electrical system of the vehicle to which lift 10 is attached. In turn, the propelling means is connected through a drive-train means that turns driving wheels on shuttle 26 that are in contact with carriage 22. For example, motor 98 depicted in FIGS. 4b and 4c. Further, the motor, e.g. electric motor 98, may be controlled by an attached or remote controller unit, e.g., a remote control for or pendent similar to those used to operate motor vehicle doors with a corresponding receiving unit in, or in proximity to, the motor. The motor could easily be placed on the other side of the carriage 22 and one skilled in the art could suitably place the one or more motors. In turn, the propelling means is connected through a drive-train that turns driving wheels on shuttle 26 that are in contact with carriage 22.

Continuing to view FIGS. 4b and 4c, when activated, motor 98 turns pulley 102, and consequently, shaft 108, via, pulley 104 and belt 106. Preferably, pulleys 102 and 104 as well as connecting belt 106 employ a positive grip system such as is used on timing belts and pulley systems. As shaft 108 is turned, it rotates drive wheels 110a and 110b. Drive rollers 112a and 112b are in contact with drive wheels 110a and 110b respectively, so that as the drive wheels rotate, the drive rollers rotate in the opposite direction. Because drive rollers 112a and 112b are in contact with the tops of two parallel rails 68, as the drive rollers turn, shuttle 26 is propelled along carriage 22.

As noted previously, when shuttle 26 bearing motorcycle 16 is near cross member 70a (FIG. 2) of carriage 22 the center of gravity of the carriage has shifted and the carriage rests on top of main frame 20. Further, when shuttle 26 has moved as far along carriage 22 as it can, i.e., it is pressing up against cross member 70a, drive wheels 110a and 110b engage a corresponding set of drive wheels 114a and 114b. Drive wheels 114a and 114b are affixed to drive gears 116a and 116b respectively. Likewise, FIG. 2a shows drive wheel 114a and drive gear 116a.

FIG. 5a is a side view (within the plane of main frame 20 and perpendicular to the longitudinal axis of the main frame) of lift 10 illustrating shuttle 26 as far as it can move along carrier 22 and resting against cross member 70a. Also, carrier 22 is as far as it can move along main frame 20, which is fully retracted within under frame 18. FIG. 5b corresponds to FIG. 5a but is viewed perpendicular to cross member 70a. Lever arm 118 is spring loaded and is adjusted by adjustment rod 119. When shuttle 26 is full against cross member 70a, the shuttle presses lever arm 118, which in turn disengages drive wheels 110a and 110b from drive rollers 112a and 112b and engages drive wheels 110a and 110b with corresponding drive wheels 114. Consequently, drive gears 116 are engaged with drive gears 120 to which drive rollers 122 are attached. As drive rollers 122 turn, carrier 22, along with shuttle 26, and motorcycle 16 are moved along the top of main frame 20 and within channels 36 of under frame 18. (Note that drive gear 116 drive and drive roller 122 are visible in FIG. 5b.) Therefore, if motor 98 continues to run after shuttle 26 can move no further along carrier 22, the carrier is moved fully forward with respect to main frame 20, which is fully retracted within under frame 18.

If the length of truck bed 14 is sufficient, as it would be for a standard pick-up truck, lift 10 will fit fully within truck bed 14, and if the truck is a standard pick-up, its tailgate can be closed. When motorcycle 16 is fully within the cargo area of truck 12, it should be securely fasted to the truck by suitable means used in the art, such as ratcheted straps cables, ropes, or chains prior to being transported. The back lift gate could also be closed in this particular embodiment.

FIGS. 6 through 10 depict a series of drawings showing the shuttle 26, moving along the carriage 22 which then pivots onto the under frame 18 before moving forward into place for transport in a truck.

Figure 11B:
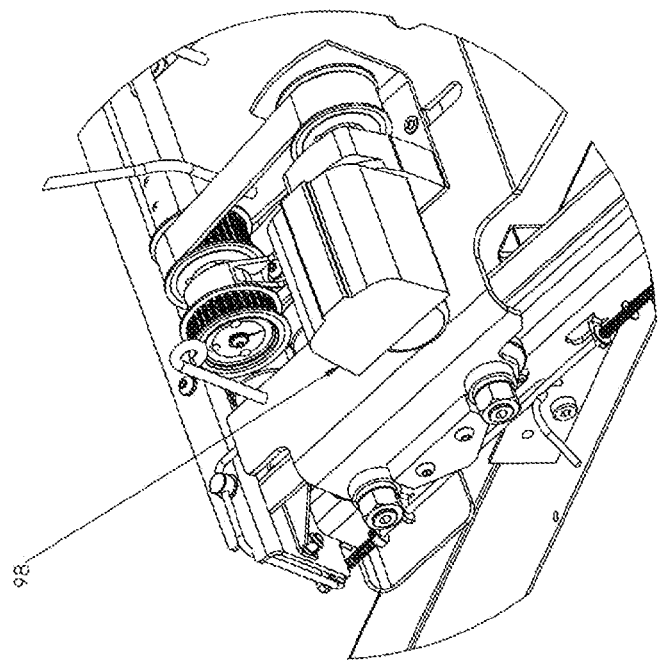
FIGS. 11*a* and 11*b* depict an alternate embodiment and a shuttle locking device.
Figure 11A:
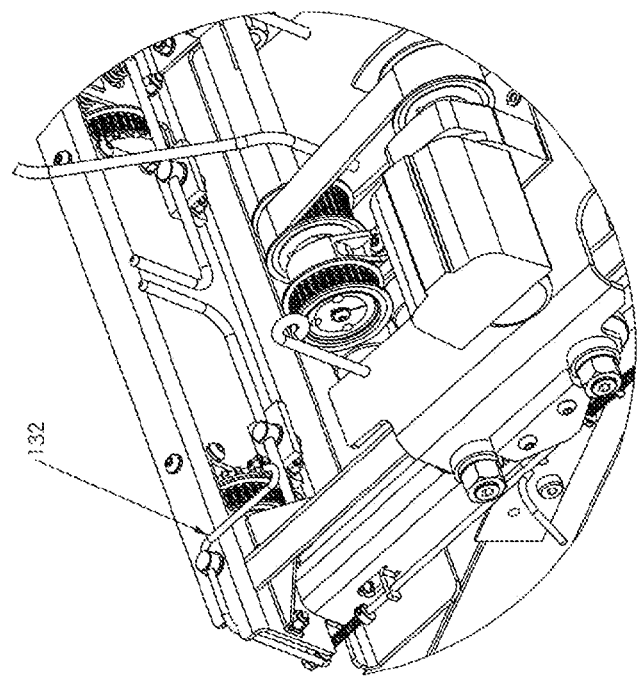

FIGS. 11a and 11b show an alternate embodiment of the lift 10 wherein the motor 98 is placed on the left side instead of the right as in other embodiments. Other changes are the addition of two shock absorbers 64 and spring dampers 130. As the shuttle 26 approaches the top of the carriage 22 it engages shuttle locking arm 132 for insuring the shuttle remains in place during the loading process. The shuttle locking arm 132 can be spring released or operated in any means that allows it to engage automatically during the loading process.

The lift device taught herein may be fabricated of any suitable material used in the art of lift and transporting devices. Preferably, it is fabricated from metal, polymeric material, composite material, and the like. Typically, steel, aluminum, or aluminum alloy would be the primary materials of choice for the majority of the lift. However, certain parts may logically be of rubber, plastic, fiberglass, wood, or other non-metallic material to reduce maintenance, improve performance, and enhance safety. For example, drive wheels and belts may be of rubber or similar material, and parts that might contact motorcycle 16 or truck 12 would be coated with a soft material to prevent damage to either vehicle.

Enhancements to improve security and safety are contemplated and within the scope of the present invention. For example, lift 10 may be equipped with locks on both electrical and mechanical components to discourage theft.

What is claimed is:

1. A lift device for loading and unloading a motorcycle onto and off of the bed of a truck having a tailgate which allows closure of the tailgate when not in use comprising:
    a) an under frame capable of being affixed to the bed of the truck;
    b) a main frame slidably affixed to the under frame;
    c) a carriage;
    d) a pivot frame attached in between the main frame and the carriage;
    e) a bidirectional motor attached to a shuttle;
    f) the shuttle that is capable of being moved by the motor along the carriage between a first end and an opposite second end where it is attached to the pivot frame and back again;
    wherein:
        i. the under frame is comprised of two substantially parallel rails;
        ii. the main frame is comprised of at least two substantially parallel and connected rails;
        iii. the shuttle comprises a motorcycle attachment device;
        iv. the shuttle and carriage are capable of pivoting with the pivot frame to lie substantially flat against the main frame when the shuttle is at the second end; and
        v. the motor can slidably move the shuttle, carriage and main frame along the under frame from a first position to a second position when the shuttle is at the second end and back again.

2. The device of claim 1 which is mounted in a truck with a tailgate which can be closed when the device is not in use.

3. The device of claim 1 wherein the shuttle is attached to the carriage by a plurality of rollers that moves within grooves within sides of rails comprising the carriage.

4. A device of claim 1 wherein the main frame slidably moves within grooves within the under frame via rollers.

5. A device of claim 1 wherein a motorcycle can be attached to the shuttle by its front wheel.

6. The device of claim 1 wherein the motor is an electric motor.

7. The device of claim 1 wherein the motor is belt driven.

* * * * *